9338X
E. Hale,
Riding Saddle.
Patented Jan. 23, 1836.
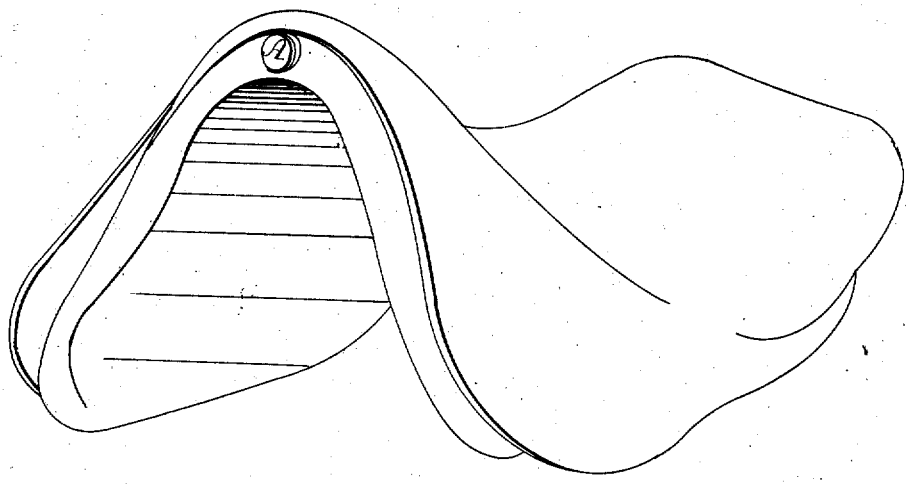
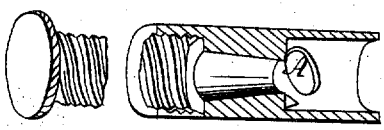
N. PETERS, PHOTO-LITHOGRAPHER, WASHINGTON, D. C.

Ebenezer Hale No. 30

The schedule referred to in these Letters Patent and making
part of the same containing a description in the words
of the said Ebenezer Hale himself of his improvements
in Saddles and Horse Collars.

To all to whom it may concern be it known
that I, Ebenezer Hale of the City, County and
State of New York have invented a new and useful
improvements in the manner of constructing Saddles
and Horse Collars in which I substitute that per-
fectly elastic article air as a stuffing for the
comparatively rigid and nonelastic materials
heretofore employed. And I do hereby declare that
the following is a full and exact description there
of. The object in view is to interpose air
between the hard materials which form the foun-
dation or more solid parts of saddles and horse
collars and those parts of them which bear upon
the animal. In the general form or manner of
making these articles I do not profess to have made
any improvement, all that I propose to do being
merely to omit the ordinary stuffing in the bear-
ing parts and to cover them with leather, cloth
other materials rendered impervious to air by means
of India rubber or otherwise so forming and fix-
ing such covering so that when inflated by means
of a condensing syringe, the bearing parts will be-
come distended and assume the intended form.
In some suitable part of the article an opening
furnished with a valve must be made for the pur-
pose of attaching the syringe. The manner
in which the air tight covering is to be attached does
not admit or require any particular [illegible] description
as

9338X as it may be varied in numerous ways, and must be left to the judgment and fancy of the workman who if skilful will be at no loss in this particular. What I claim as my invention is merely the substitution of air for other materials in forming a stuffing for the bearing parts of Saddles and Horse Collars Witnesses

[illegible] Henry Deane (L.S.)

[illegible] John D. Jones (L.S.)

Elem.r Hale

Drawing made from [illegible] Specif. (35 k [illegible])